US012669150B2

(12) United States Patent
Seno et al.

(10) Patent No.: US 12,669,150 B2
(45) Date of Patent: Jun. 30, 2026

(54) PRESSING APPARATUS

(71) Applicant: Daifuku Co., Ltd., Osaka (JP)

(72) Inventors: Shuei Seno, Hinocho (JP); Kazuki Ogawa, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 329 days.

(21) Appl. No.: 18/376,860

(22) Filed: Oct. 5, 2023

(65) Prior Publication Data

US 2024/0117845 A1 Apr. 11, 2024

(30) Foreign Application Priority Data

Oct. 6, 2022 (JP) ................................. 2022-161458

(51) Int. Cl.
| *F16D 3/52* | (2006.01) |
| *F16D 3/62* | (2006.01) |
| *F16D 3/78* | (2006.01) |
| *F16D 13/04* | (2006.01) |

(52) U.S. Cl.
CPC ................. *F16D 3/52* (2013.01); *F16D 3/62* (2013.01); *F16D 3/78* (2013.01); *F16D 13/04* (2013.01)

(58) Field of Classification Search
CPC .................................................... B66F 7/0608
USPC ...................................................... 254/93 H
See application file for complete search history.

(56) References Cited

U.S. PATENT DOCUMENTS

| 3,116,910 A | * | 1/1964 | Moore | .................. | B66F 7/0641 |
| | | | | | 254/122 |
| 4,882,932 A | * | 11/1989 | Corghi | .................... | G01M 1/28 |
| | | | | | 254/93 H |

| 5,632,209 A | * | 5/1997 | Sakakibara | ........... | B66F 7/0608 |
| | | | | | 248/588 |
| 6,474,624 B2 | * | 11/2002 | Sawano | .................. | B66F 3/245 |
| | | | | | 254/93 H |
| 12,304,786 B2 | * | 5/2025 | Chou | .................... | B66F 7/0608 |
| 12,358,768 B2 | * | 7/2025 | Walther | ............... | B66F 7/0633 |
| 2021/0394567 A1 | * | 12/2021 | Ni | .......................... | B66F 7/0666 |

(Continued)

FOREIGN PATENT DOCUMENTS

| JP | 667489 U | 9/1994 |
| JP | 2000169093 A | 6/2000 |
| JP | 2000327276 A | 11/2000 |

(Continued)

*Primary Examiner* — Jason L Vaughan
(74) *Attorney, Agent, or Firm* — The Webb Law Firm

(57) ABSTRACT

A pressing apparatus includes base members; pressing members configured to move in a first direction with respect to the base members; a link mechanism; a driving device; and a coupling mechanism, in which the link mechanism includes: fixed pivots having fixed positions with respect to the base members; driven pivots configured to be driven by the driving device and move along a second direction; and moving pivots having fixed positions with respect to the pressing members and configured to move in the first direction together with the movement of the driven pivots, the driving device includes a first threaded portion provided for the driving shaft; and a driven member including a second threaded portion, and the coupling mechanism includes: a coupling member having a fixed position with respect to the driven pivots; and a spring member configured to apply elastic force between the driven member and the coupling member.

5 Claims, 9 Drawing Sheets

(56)                    References Cited

U.S. PATENT DOCUMENTS

| | | | |
|---|---|---|---|
| 2023/0040661 A1* | 2/2023 | May | F16M 11/42 |
| 2024/0168499 A1* | 5/2024 | Zhu | G05D 3/12 |

FOREIGN PATENT DOCUMENTS

| | | |
|---|---|---|
| JP | 200395586 A | 4/2003 |
| JP | 202166562 A | 4/2021 |

* cited by examiner

Fig.7

PRESSING APPARATUS

CROSS-REFERENCE TO RELATED APPLICATION

This application claims priority to Japanese Patent Application No. 2022-161458 filed Oct. 6, 2022, the disclosure of which is hereby incorporated by reference in its entirety.

BACKGROUND OF THE INVENTION

Field of the Invention

The present disclosure relates to a pressing apparatus.

Description of Related Art

A pressing apparatus is known which includes: a base member; and a pressing member configured to move in a predetermined first direction with respect to the base member to be in a pressed state, in which the pressing member is pressed against an object to be pressed ("press object"), or a separated state, in which the pressing member is separated from the press object. Japanese Unexamined Patent Application Publication No. 2021-066562 (Patent Document 1) discloses a pressing apparatus including a base member (base frame 26) and a pressing member (load receiving frame 25).

The pressing apparatus of Patent Document 1 has had such a problem that the distance between the base member and the pressing member is fixed in the pressed state in which the pressing member is pressed against the press object, and therefore the pressed state cannot be maintained when the position in the first direction of the press object with respect to the base member fluctuates.

SUMMARY OF THE INVENTION

Thus, it has been desired to realize a pressing apparatus in which the pressed state is easily maintained even when the position of the press object fluctuates in the first direction.

A pressing apparatus according to the present disclosure includes: a base member; a pressing member configured to move in a predetermined first direction with respect to the base member to be in a pressed state, in which the pressing member is pressed against a press object, or a separated state, in which the pressing member is separated from the press object; a link mechanism coupling the base member and the pressing member; a driving device configured to drive the link mechanism; and a coupling mechanism coupling the link mechanism and the driving device, in which the link mechanism includes: at least one fixed pivot having a fixed position with respect to the base member; at least one driven pivot configured to be driven by the driving device and move along a predetermined second direction; and at least one moving pivot having a fixed position with respect to the pressing member and configured to move in the first direction together with the movement of the driven pivot, the driving device includes: a driving source; a driving shaft arranged along the second direction and drivable by the driving source to rotate; a first threaded portion provided for the driving shaft; and a driven member including a second threaded portion screwed with the first threaded portion and configured to move along the second direction in response to the rotation of the driving shaft; and the coupling mechanism includes: a coupling member having a fixed position with respect to the driven pivot; and a spring member having elasticity in the second direction and configured to apply elastic force between the driven member and the coupling member.

According to this configuration, a driving force of the driving source is converted into a driving force in the second direction of the driven member, and the driven pivots are moved back and forth along the second direction, whereby the pressing members in which the moving pivots are fixed can be moved in the first direction and the pressing members can be pressed against the press object. Further, the driven member is moved in a direction in which the pressing members are further pressed against the press object from the state in which the pressing members abut on the press object, thereby achieving a state in which the elastic force of the spring member is applied to the coupling member and the driven member. Thus, the pressing members can be brought into a state of being pressed against the press object with a force corresponding to the elasticity of the spring member, and, even when the position in the first direction of the press object with respect to the base members fluctuates, the positions in the first direction of the pressing members follow the movement of the press object, and therefore the pressed state is easily maintained.

BRIEF DESCRIPTION OF THE DRAWINGS

FIG. 7 is a view illustrating a towing vehicle including the pressing apparatus of FIG. 1;

DESCRIPTION OF THE INVENTION

First Embodiment

Figure 1:
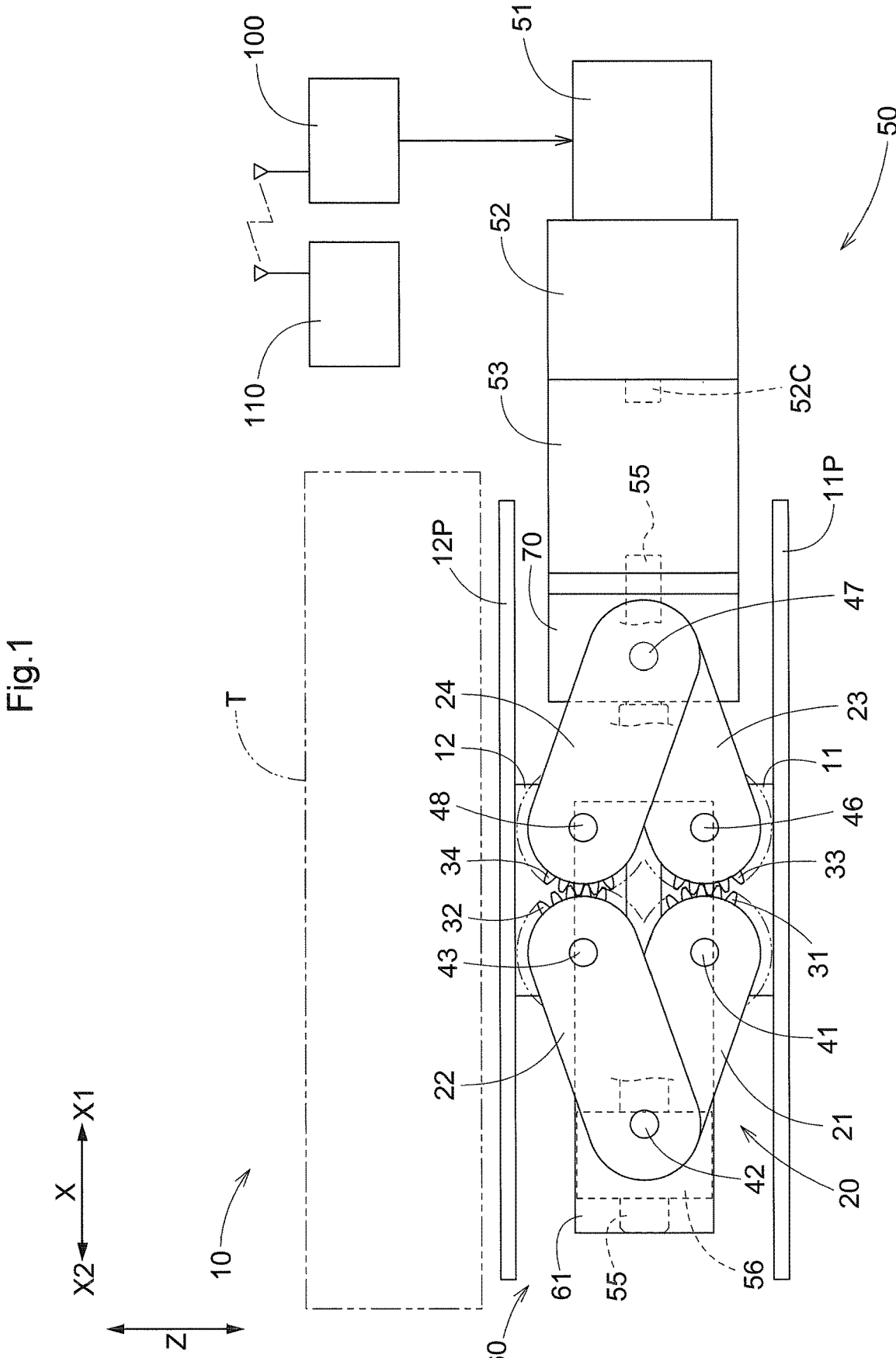
FIG. 1 is a side view of a pressing apparatus according to a first embodiment.

Hereinafter, a pressing apparatus 10 according to this embodiment is described with reference to the drawings. FIG. 1 is a side view of the pressing apparatus 10 according to this embodiment. The pressing apparatus 10 includes base members 11 and pressing members 12. The pressing apparatus 10 further includes a link mechanism 20 coupling the base members 11 and the pressing members 12, and a driving device 50 driving the link mechanism 20. Herein, a predetermined direction is defined as a first direction Z. In this embodiment, the first direction Z is a vertical direction. Further, a predetermined direction is defined as a second direction X. In this embodiment, the second direction X is a direction orthogonal to the vertical direction. One side in the second direction X is defined as a second-direction first side X1 and the other side is defined as a second-direction second side X2. A direction orthogonal to the second direction X as viewed in the first direction Z is defined as a third direction Y.

Figure 2:
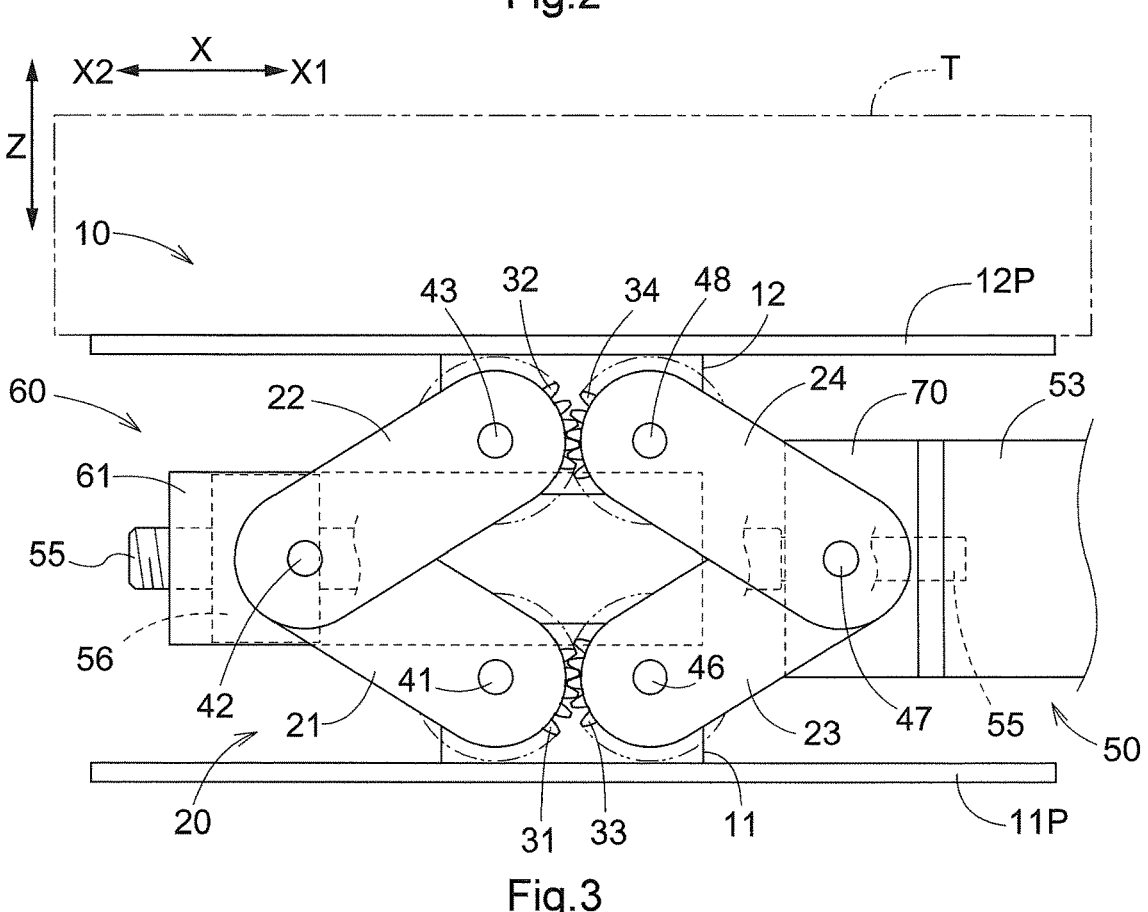
FIG. 2 is a side view illustrating a state in which a coupling member of FIG. 1 has moved in a second direction.
Figure 3:
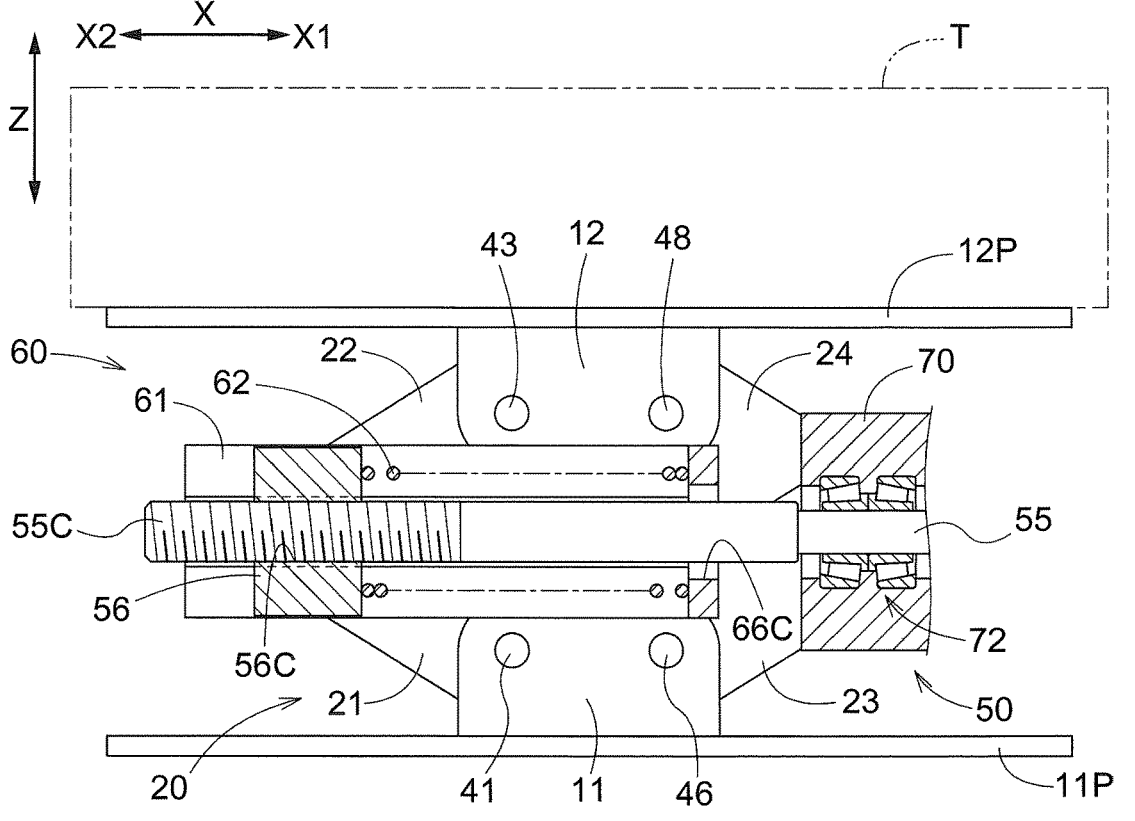
FIG. 3 is a cross-sectional view illustrating a pressed state in which a driven member of FIG. 1 has moved in the second direction.

In this embodiment, the pressing members 12 move in the predetermined first direction Z with respect to the base members 11 to be in a pressed state, in which the pressing members 12 are pressed against an object to be pressed T (herein below, frequently referred to as "press object T"), or a separated state, in which the pressing members 12 are separated from the press object T. In the illustrated example, the base member 11 includes a bottom plate portion 11P. The pressing member 12 further includes a top plate portion 12P pressed against the press object T. FIG. 1 illustrates the separated state in which the pressing member 12 is separated from the press object T. FIG. 2 is a side view of the pressing apparatus 10 and illustrates a contact state in which the pressing member 12 is in contact with the press object T. FIG. 3 is a cross-sectional view of the pressing apparatus 10 including the shaft center of a driving shaft 55 described later and illustrates a pressed state in which the pressing member 12 is further pressed against the press object T.

In this embodiment, the link mechanism 20 includes first fixed pivots 41 having fixed positions with respect to the base members 11, driven pivots 42 driven by a driving device and moving along the predetermined second direction X, and first moving pivots 43 having fixed positions with respect to the pressing members 12 and moving in the first direction Z together with the movement of the driven pivots 42. The link mechanism 20 further includes first links 21 connecting the first fixed pivots 41 and the driven pivots 42 and second links 22 connecting the first moving pivots 43 and the driven pivots 42. Herein, the first fixed pivots 41, the driven pivots 42, and the first moving pivots 43, and second fixed pivots 46, interlocking pivots 47, and second moving pivots 48 which are described later each indicate the shaft center of a shaft member constituting the link mechanism 20.

In this embodiment, the link mechanism 20 includes the interlocking pivots 47 moving to the side opposite to the driven pivots 42 along the second direction X as viewed in the first direction Z together with the movement of the driven pivots 42, the first fixed pivots 41 and the second fixed pivots 46 arranged in the second direction X as the fixed pivots, and the first moving pivots 43 and the second moving pivots 48 arranged in the second direction X as the moving pivots. The link mechanism 20 further includes third links 23 connecting the second fixed pivots 46 and the interlocking pivots 47 and fourth links 24 connecting the second moving pivots and the interlocking pivots 47.

In this embodiment, the link mechanism 20 includes first gears 31 fixed to the first links 21 coaxially with the first fixed pivots 41 and third gears 33 fixed to the third links 23 coaxially with the second fixed pivots 46. The first gears 31 and the third gears 33 are engaged with each other. In this embodiment, the link mechanism 20 further includes second gears 32 fixed to the second links 22 coaxially with the first moving pivots 43 and fourth gears 34 fixed to the fourth links 24 coaxially with the second moving pivots 48. The second gears 32 and the fourth gears 34 are engaged with each other.

In this embodiment, the driving device 50 includes a driving source 51, the driving shaft 55, and a driven member 56. As illustrated in FIG. 3, the driving device 50 of this embodiment includes a first threaded portion 55C provided for the driving shaft 55. The driving shaft 55 is arranged along the second direction X and is drivable by the driving source 51 to rotate. The driven member 56 includes a second threaded portion 56C screwed with the first threaded portion 55C and moves along the second direction X in response to the rotation of the driving shaft 55. In the illustrated example, the first threaded portion 55C is a male threaded portion provided on the outer surface of the driving shaft 55. The driven member 56 is a nut-like member, and the second threaded portion 56C is a female threaded portion provided on the inner surface of the driven member 56.

In this embodiment, the driving source 51 is arranged on the second-direction first side X1 relative to the first fixed pivots 41. Herein, the second-direction first side X1 is the side where the fixed pivots 41, 46 are arranged with respect to the driven pivots 42 in the second direction X. In this embodiment, the driving device 50 further includes guide portions 57 (see FIG. 4) allowing the driven member 56 to move along the second direction X and regulating the rotation around the driving shaft 55 of the driven member 56. This regulates the rotation of the driven member 56 together with the rotation of the driving shaft 55, and the driven member 56 moves along the second direction X in response to the rotation of the driving shaft 55. In the example illustrated in FIG. 1, the driving device 50 further includes the driving source 51, a decelerator 52, and a shaft joint 53 as rotating electrical machines. The rotation of the driving source 51 is decelerated by the decelerator 52 and transmitted from an output shaft 52C of the decelerator 52 to the driving shaft 55 via the shaft joint 53.

In this embodiment, the pressing apparatus 10 includes a coupling mechanism 60 coupling the link mechanism 20 and the driving device 50. The coupling mechanism 60 includes a coupling member 61 having a fixed position with respect to the driven pivots 42, and a spring member 62 having elasticity in the second direction X and configured to apply elastic force between the driven member 56 and the coupling member 61. In this embodiment, the spring member 62 is a coil spring. Thus, a driving force of the driving source 51 is converted into a driving force in the second direction X of the driven member 56, and the driven pivots 42 are moved back and forth along the second direction X, whereby the pressing members 12 to which the first moving pivots 43 are fixed can be moved in the first direction Z and the pressing members can be pressed against the press object T. The coupling member 61 fixed to the driven pivots and the driven member 56 are connected by the spring member 62, and therefore the driven member 56 is moved in a direction in which the pressing members 12 are further pressed against the press object T from the state in which the pressing members 12 abut on the press object T, thereby achieving a state in which the spring member 62 is deflected to apply elastic force of the spring member 62 to the coupling member 61 and the driven member 56.

Figure 4:
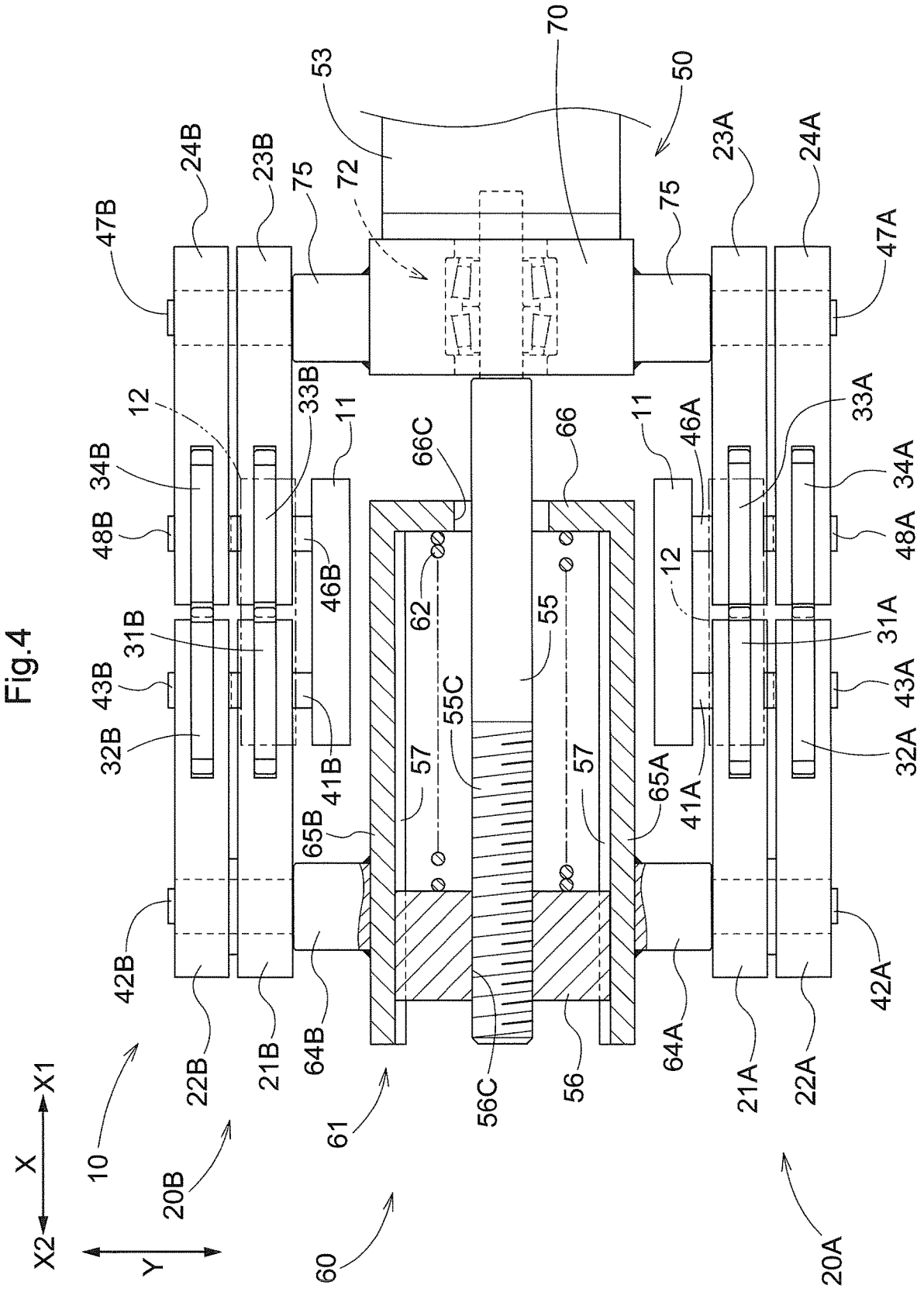
FIG. 4 is a top view of the pressing apparatus of FIG. 1.
Figure 5:
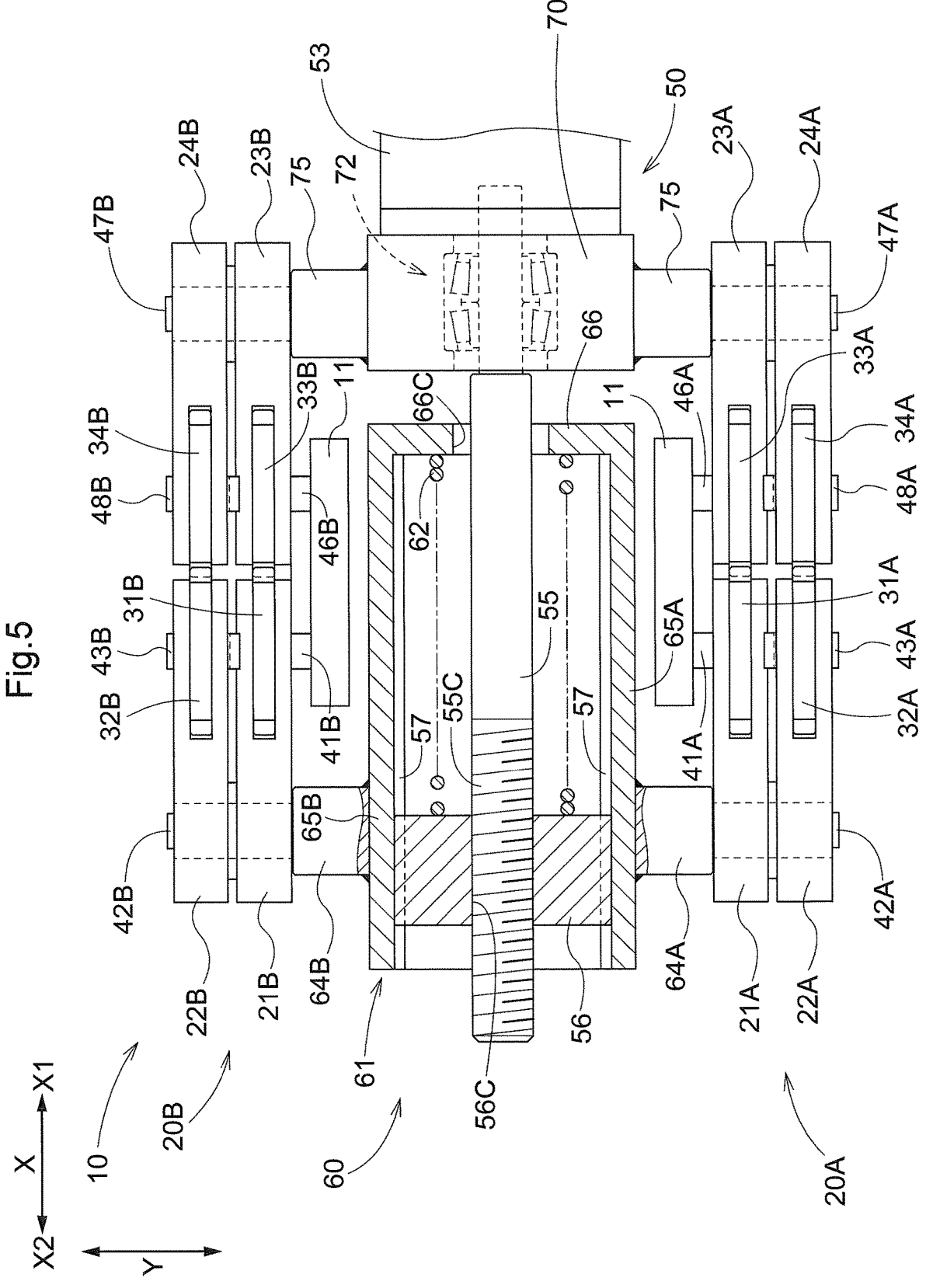
FIG. 5 is a top view illustrating the state in which the coupling member of FIG. 1 has moved in the second direction.
Figure 6:
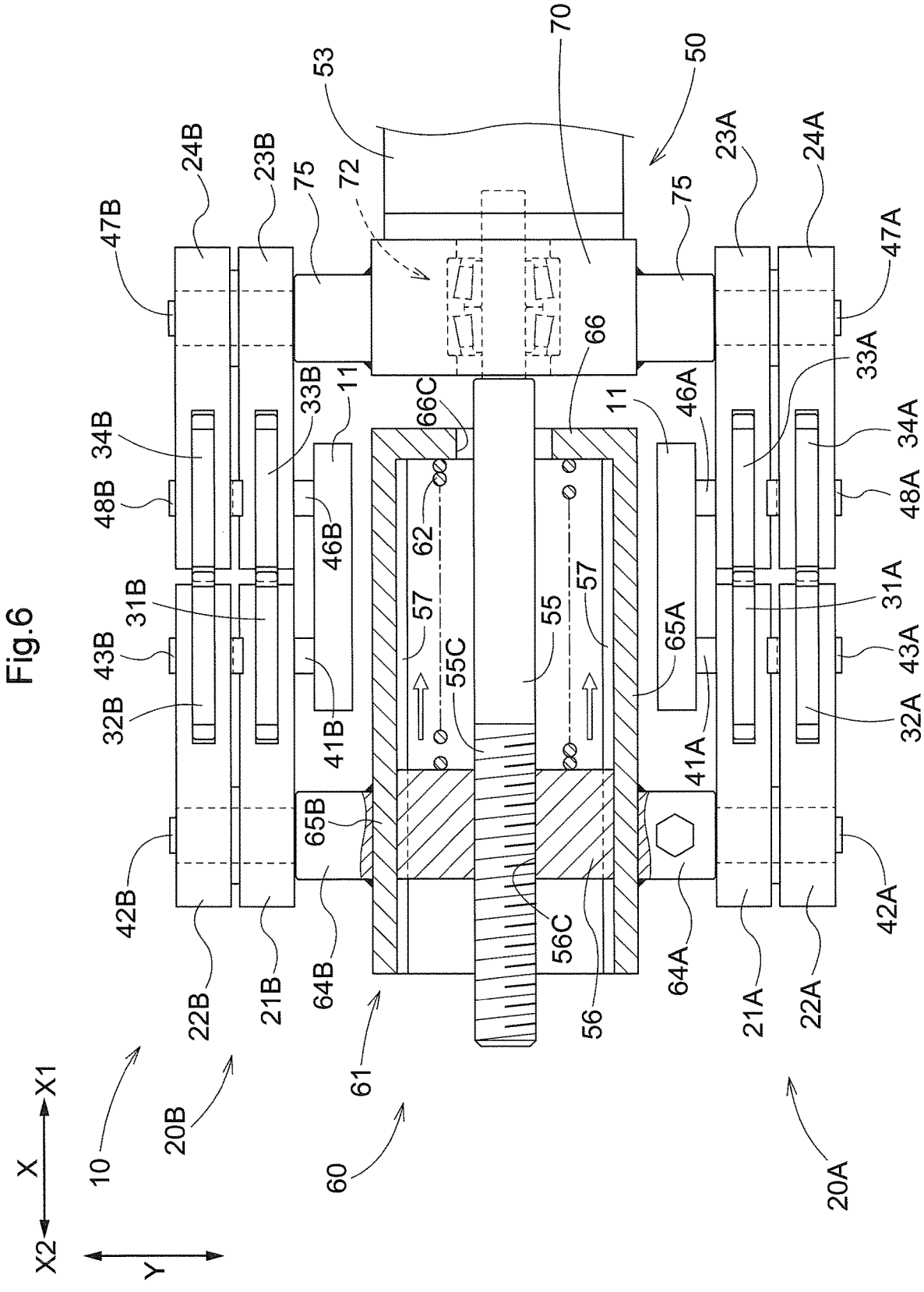
FIG. 6 is a top view illustrating the pressed state in which the driven member of FIG. 1 has moved in the second direction.

FIG. 4 is a view illustrating the top surface of the pressing apparatus 10 in the separated state of FIG. 1. FIG. 5 is a view illustrating the top surface of the pressing apparatus 10 in the contact state of FIG. 2. FIG. 6 is a view illustrating the top surface of the pressing apparatus in the pressed state of FIG. 3. FIGS. 4, 5, 6 do not illustrate the top plate portions 12P of the pressing members 12.

In this embodiment, the link mechanism 20 includes a first link set 20A and a second link set 20B. The first link set 20A and the second link set 20B are configured to operate identically. The first link set 20A includes a first fixed pivot 41A, a driven pivot 42A, and a first moving pivot 43A. The second link set 20B includes a first fixed pivot 41B, a driven pivot 42B, and a first moving pivot 43B. The first link set 20A and the second link set 20B are arranged apart from each other in the third direction Y. FIGS. 1 and 2 described above illustrate the first link set 20A and FIG. 3 illustrates the second link set 20B.

In this embodiment, the coupling member 61 couples the driven pivot 42A of the first link set 20A and the driven pivot 42B of the second link set 20B. The driving shaft 55, the driven member 56, the coupling member 61, and the spring member 62 are arranged between the first link set 20A and the second link set 20B in the third direction Y. Thus, the dimension in the second direction X of the pressing apparatus 10 is easily made small.

In this embodiment, the coupling member 61 includes a first attachment portion 64A attached to the driven pivot 42A of the first link set 20A and a second attachment portion 64B attached to the driven pivot 42B of the second link set 20B. The coupling member 61 further includes a first extension portion 65A extending from the first attachment portion 64A to the second-direction first side X1 and a second extension portion 65B extending from the second attachment portion 64B to the second-direction first side X1. The coupling member 61 further includes a connection portion 66 connecting the first extension portion 65A and the second extension portion 65B in the third direction Y on the second-direction first side X1 with respect to the first attachment portion 64A and the second attachment portion 64B. In the illustrated example, the coupling member 61 is a U-shaped member. The first extension portion 65A and the second extension portion 65B of the coupling member 61 are provided with the guide portions 57 described above. Herein, the "extending" in a certain direction indicates that, when the direction is set as a reference direction, a component toward at least the reference direction is provided. Suitably, the number of the components toward the reference direction is larger than the number of components toward a direction orthogonal to the reference direction.

In this embodiment, the driven member 56 is arranged at a position between the first extension portion 65A and the second extension portion 65B in the third direction Y and overlaps with the first extension portion 65A and the second extension portion 65B as viewed in the third direction Y. The spring member 62 is a compression spring between the first extension portion 65A and the second extension portion 65B in the third direction Y and in contact with the driven member 56 and the connection portion 66 in the second direction X. In the illustrated example, the connection portion 66 is provided with a through hole 66C through which the driving shaft 55 is inserted. With respect to the arrangement of the two members, "overlapping as viewed in a specific direction" indicates that, when a virtual straight line parallel to the visual line direction is moved in each direction orthogonal to the virtual straight line, there is a region where the virtual straight line intersects both of the two members.

In the illustrated example, the first link set 20A includes an interlocking pivot 47A, a second fixed pivot 46A, a second moving pivot 48A, a first link 21A, a second link 22A, a third link 23A, a fourth link 24A, a first gear 31A, and a third gear 33A as with the link mechanism 20. The first gear 31A and the third gear 33A are engaged with each other. In this embodiment, the first link set 20A further includes a second gear 32A and a fourth gear 34A. The second gear 32A and the fourth gear 34A are engaged with each other.

In the illustrated example, the second link set 20B includes an interlocking pivot 47B, a second fixed pivot 46B, a second moving pivot 48B, a first link 21B, a second link 22B, a third link 23B, a fourth link 24B, a first gear 31B, and a third gear 33B as with the link mechanism 20. The first gear 31B and the third gear 33B are engaged with each other. In this embodiment, the second link set 20B further includes a second gear 32B and a fourth gear 34B. The second gear 32B and the fourth gear 34B are engaged with each other.

In this embodiment, the link mechanism 20 is provided with a driving source attachment portion 70. In the illustrated example, the driving source attachment portion 70 is provided integrally with an interlocking-pivot coupling member 75 coupling the interlocking pivot 47A of the first link set 20A and the interlocking pivot 47B of the second link set 20B. In this embodiment, the driving source 51 is arranged on the second-direction first side X1 relative to the first fixed pivot 41A of the first link set 20A and the first fixed pivot 41B of the second link set 20B.

In this embodiment, the driving source attachment portion 70 supports the driving source 51 through the shaft joint 53 and the decelerator 52. The driving source attachment portion further supports the driving shaft 55 through a bearing 72. More specifically, in this embodiment, the driving shaft 55 is supported by the driven member 56 and the driving source attachment portion 70. In this embodiment, a tapered roller bearing is used for the bearing 72, but other radial roller bearings, radial ball bearings, plain bearings, and the like may be used. Suitably, the movement range of the driven member 56 in the second direction X is on the side of the driven pivots 42 relative to the midpoint between the driven pivots 42 and the interlocking pivots 47 as viewed in the third direction Y. More suitably, the movement range is within the range where the driven member 56 overlaps with the driven pivots 42 as viewed in the third direction Y. Thus, the support of the driving shaft 55 by the driven member 56 and the bearing 72 is easily stabilized.

Hereinafter, the state change of the pressing member 12 of this embodiment is described using FIGS. 1 to 6. FIGS. 1 and 4 illustrate the "separated state" in which the pressing members 12 are separated from the press object T, which is a state in which the spring member 62 does not apply elastic force between the driven member 56 and the coupling member 61. When the driving shaft 55 is driven by the driving source 51 to rotate, the driven member 56 moves to the second-direction first side X1 from this state. When the driven member 56 moves, the coupling member 61 and the driven pivots 42 move to the second-direction first side X1 through the spring member 62. The driven pivots 42 stop the movement to the second-direction first side X1 when the pressing members 12 are brought into the "contact state" of being in contact with the press object T.

FIGS. 2 and 5 illustrate the above-described "contact state". When the driving shaft 55 is driven by the driving source 51 to rotate, the driven member 56 further moves to the second-direction first side X1 from this state. However, the coupling member 61 stops, and therefore the spring member 62 is deflected between the coupling member 61 and the driven member 56, so that the pressing member 12 is brought into the "pressed state" of being pressed against the press object T.

FIGS. 3 and 6 illustrate the above-described "pressed state". In the pressed state illustrated in FIGS. 3 and 6, even when the position of the press object T with respect to the base members 11 fluctuates to either side in the first direction Z, the pressed state can be maintained by causing the position in the first direction Z of the pressing member 12 to follow the movement of the press object T. In this embodiment, the spring member 62 does not apply elastic force between the driven member 56 and the coupling member 61 in the "separated state" and the "contact state", but a configuration may be acceptable in which the spring member 62 applies elastic force between the driven member 56 and the coupling member 61 in the "separated state" and the "contact state".

Figure 7:
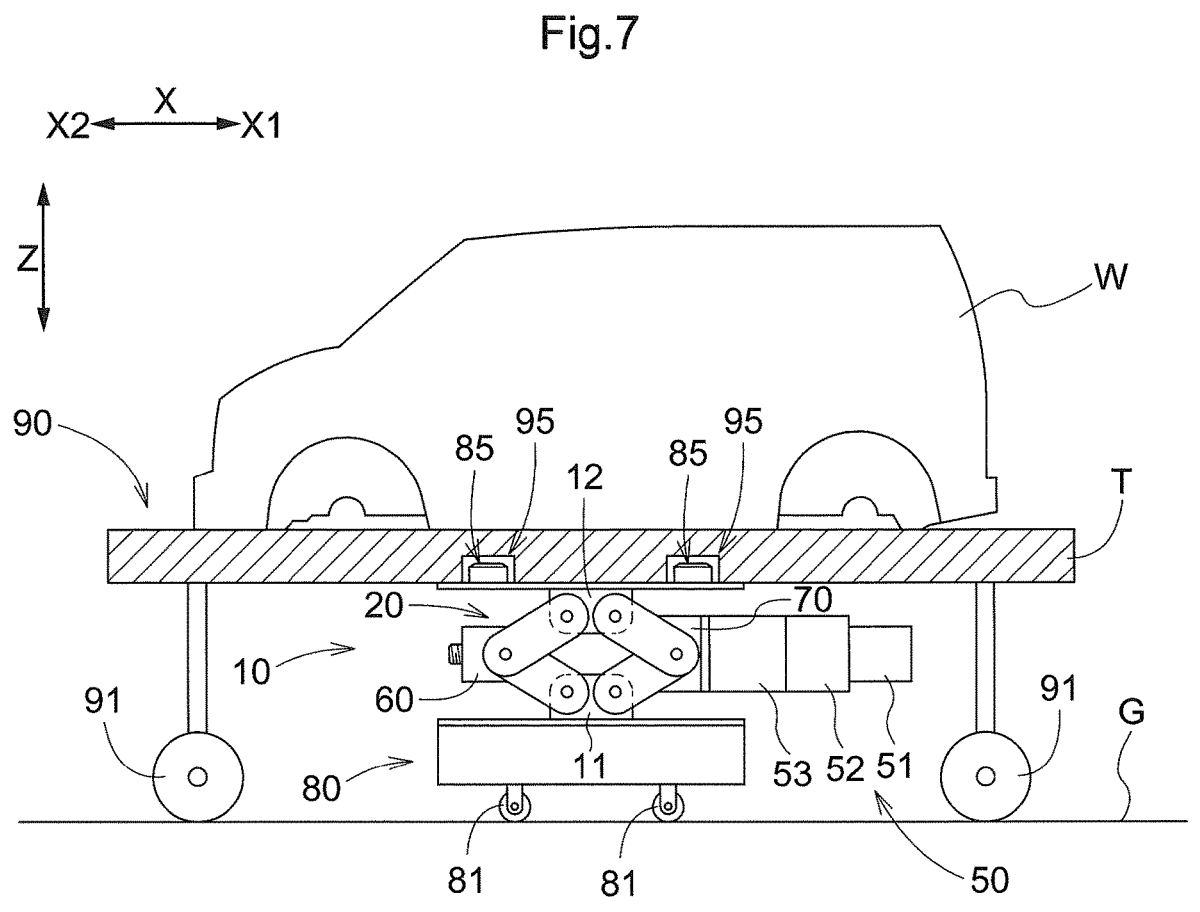

FIG. 7 illustrates a towing vehicle 80 including the pressing apparatus 10 and a towed vehicle 90. In this embodiment, the press object T is the towed vehicle 90 towed by the towing vehicle 80. The towed vehicle 90 includes engagement sections 95. In this embodiment, the engagement sections 95 are the press objects T against which the pressing members 12 are pressed.

In this embodiment, the towed vehicle 90 includes wheels 91. The towed vehicle further includes a loading pallet on which an article W is loaded. In the illustrated example, the article W is an automobile body. In the illustrated example, the engagement sections 95 are recessed portions each including a surface to be pressed and a hole portion. The shape of the hole portion of the engagement section 95 is, for example, an oblong hole long in the second direction X, an oval, a perfect circle, or the like.

In this embodiment, the base member 11 is fixed to the towing vehicle 80 including driving wheels 81. The pressing member 12 further includes engaging portions 85 engageable with the engagement sections 95. In the illustrated example, the engaging portions 85 are protruding portions each including a pressing surface and an engagement pin.

In this embodiment, the pressing members 12 are pressed against the press object T from below for the engaging portions 85 to become engaged with the engagement sections 95. The driving wheels 81 are pressed against a surface G by the reaction force that the pressing members 12 receive from the press object T. Thus, by the pressing by the pressing apparatus 10, the engaging portions 85 of the pressing apparatus 10, in which the base members 11 are fixed to the towing vehicle 80, can be engaged with the engagement sections 95 of the towed vehicle 90, and the driving wheels 81 of the towing vehicle 80 can be pressed against the surface G, thereby ensuring a large friction force of the driving wheels 81. Thus, even when the weight of the towed vehicle 90 is heavy, the slippage of the driving wheels 81 of the towing vehicle 80 is easily minimized. Even when the position in the first direction Z of the press object T with respect to the base members 11 fluctuates due to a change in the slope or the unevenness of the surface G, the pressed state is easily maintained by making the positions in the first direction Z of the pressing members 12 follow the movement of the press object T.

In this embodiment, a deflection amount $\Delta x$ (mm) of the spring member 62 may be set such that the pressing members 12 are not separated from the press object T even when the position in the first direction Z of the press object T with respect to the base members 11 are maximally displaced. Thus, the pressed state of the press object T by the pressing members 12 can be appropriately maintained. Such a setting can be realized by calculating in advance the maximum displacement of the position in the first direction Z of the press object T with respect to the base members 11 and setting the deflection amount $\Delta x$ of the spring member 62 to a value larger than the maximum displacement. The deflection amount $\Delta x$ of the spring member 62 can be set by the rotary drive of the driving shaft 55 by the driving device 50, for example.

In the illustrated example, the side surfaces of the engagement pins of the engaging portions 85 protruding upward contact the side surfaces of the hole portions having openings on the lower side, and a driving force of the towing vehicle 80 is transmitted to the towed vehicle 90, whereby the towed vehicle 90 is towed. In the illustrated example, the engagement pins of the engaging portions 85 and the bottoms of the hole portions of the engagement sections do not contact each other in the pressed state. Examples of the surface G include the floors of buildings, roads, the top surfaces of rails, and the like. Examples of the towing vehicle 80 include unmanned vehicles, motor cars, passenger cars, trains, and the like. The towed vehicle 90 may be one including a sliding surface instead of the wheels 91. Examples of the towed vehicle 90 include article transport carriages, motor cars, passenger cars, trains, and the like.

In this embodiment, the pressing apparatus 10 includes a control device 100 controlling the driving device 50. The control device 100 controls the amount by which the driving source 51 rotates the driving shaft 55 such that the deflection amount $\Delta x$ of the spring member 62 increases with an increase in the weight of the towed vehicle 90. Thus, a pressing force F by the pressing apparatus 10 can be increased with an increase in the weight of the towed vehicle 90. More specifically, the driving wheels 81 of the towing vehicle 80 can be strongly pressed against the surface G with an increase in the weight of the towed vehicle 90, and therefore the slippage of the driving wheels 81 is easily minimized. In this embodiment, the weight of the towed vehicle includes the weight of the article W.

In this embodiment, the pressing force F may be set to a value smaller than such a magnitude that the press object T can be displaced in the first direction Z. The pressing force F (N) is indicated by Equation (1) below using the deflection amount $\Delta x$ (mm) of the spring member 62, a spring constant K (N/mm) of the spring member 62, and a force increase/decrease rate Cr (%) in the link mechanism 20, for example, $$F = K \times \Delta x \times Cr \tag{1}$$

The maximum value of the pressing force F (N) may be set to a value smaller than the minimum value of a weight (N) of the towed vehicle 90. The minimum value of the weight (N) of the towed vehicle 90 is the weight of the towed vehicle 90 on which the article W is not loaded, for example.

In this embodiment, the control device 100 acquires weight information of the towed vehicle 90 from a host control device 110. The weight information of the towed vehicle 90 includes the type of the towed vehicle 90, the type of the article W, the presence or absence of the article W, and the like, for example. The weight information of the towed vehicle 90 may be the actual weight of the towed vehicle 90 or the article W measured by a weighing scale (not illustrated).

Second Embodiment

Hereinafter, the pressing apparatus 10 according to a second embodiment is described with reference to the drawings. This embodiment is different from the first embodiment in that the spring member 62 is a tension spring and the coupling member 61 does not include the first extension portion 65A and the second extension portion 65B. The following description focuses on the differences from the first embodiment. The respects not particularly described are the same as those in the first embodiment.

Figure 8:
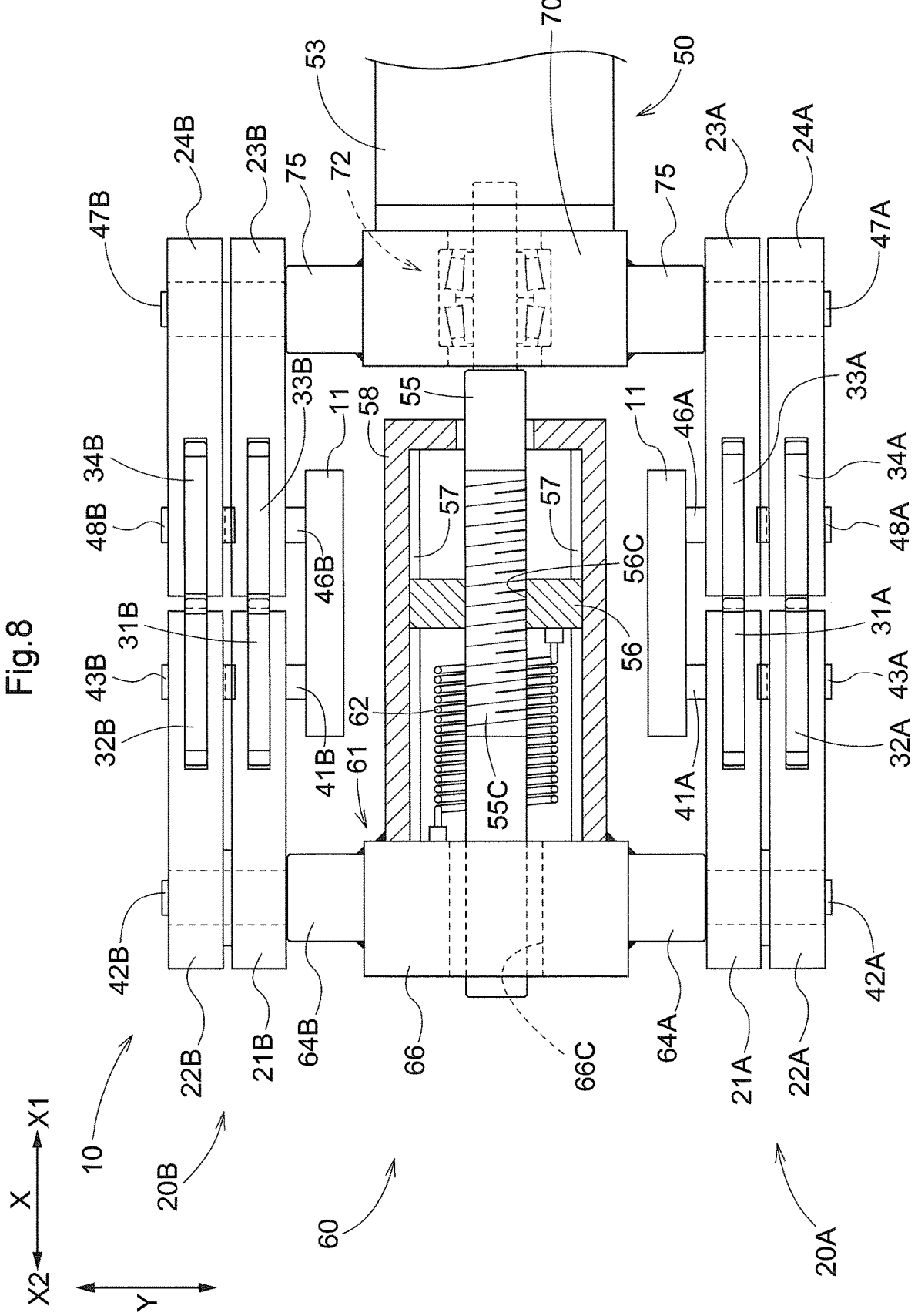
FIG. 8 is a top view of a pressing apparatus according to a second embodiment.

FIG. 8 is a top view of the pressing apparatus 10 according to the second embodiment and is a view corresponding to FIG. 4 in the first embodiment. In FIG. 8, the pressing members 12 are in the separated state, in which the pressing members 12 are separated from the press object T. In this embodiment, the coupling member 61 includes the first attachment portion 64A attached to the driven pivot 42A of the first link set 20A, the second attachment portion 64B attached to the driven pivot 42B of the second link set 20B, and the connection portion 66 connecting the first attachment portion 64A and the second attachment portion 64B in the third direction Y. The spring member 62 is a tension coil spring and is held between the first attachment portion 64A and the second attachment portion 64B in the third direction Y and between the driven member 56 and the connection portion 66 in the second direction X. In the illustrated example, the coupling member 61 fixed to the driven pivots 42 and the driven member 56 is connected by the spring member 62. The coupling member 61 is further provided with guide members 58 formed with the guide portions 57 extending to the second-direction first side X1.

Thus, the coupling member 61 fixed to the driven pivots 42 and the driven members 56 are connected by the spring member 62, and therefore the driven member 56 is moved in a direction in which the pressing members 12 are further pressed against the press object T from the state in which the pressing members 12 abut on the press object T, thereby achieving a state in which the spring member 62 can be extended to apply elastic force of the spring member 62 to the coupling member 61 and the driven member 56.

Third Embodiment

Hereinafter, the pressing apparatus 10 according to a third embodiment is described with reference to the drawings. This embodiment is different from the first embodiment in that the type of the link mechanism 20 is different and the driving device 50 does not include the decelerator 52 and the shaft joint 53. The following description focuses on the differences from the first embodiment. The respects not particularly described are the same as those in the first embodiment.

Figure 9:
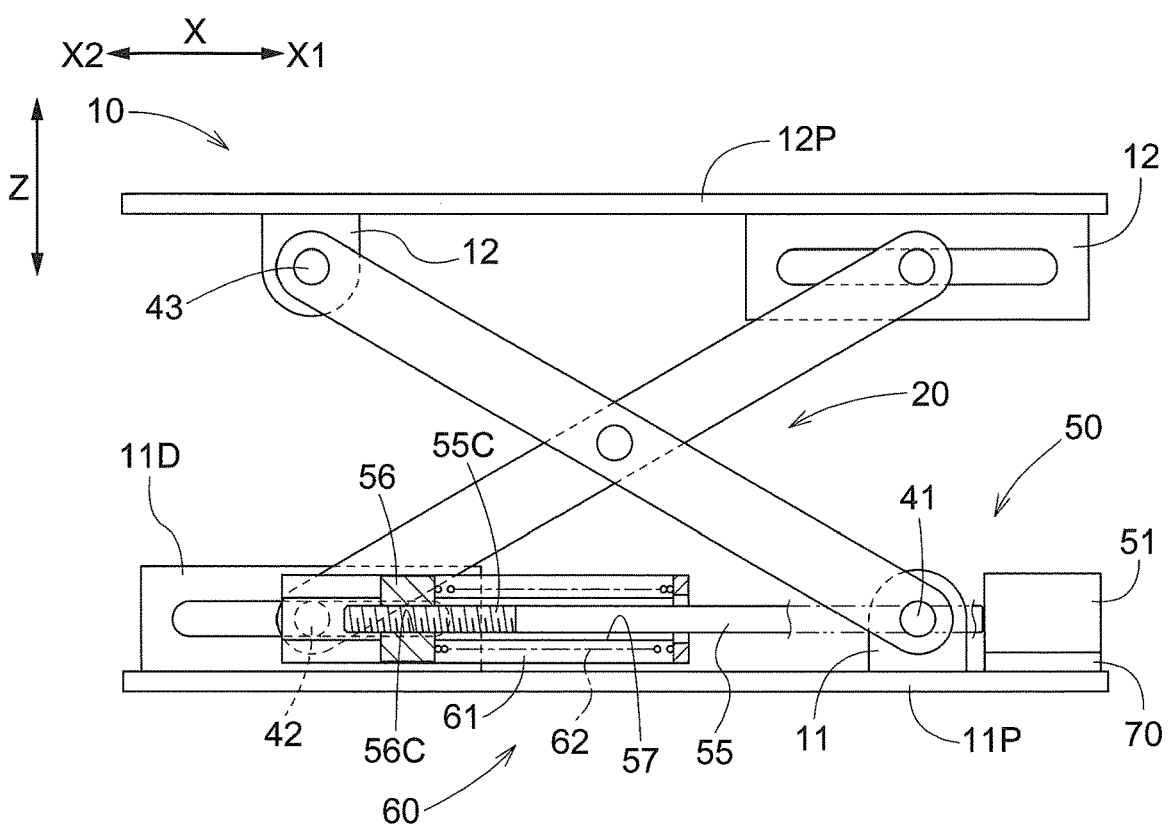
FIG. 9 is a cross-sectional view of a pressing apparatus according to a third embodiment.

FIG. 9 is a cross-sectional view of the pressing apparatus 10 according to the third embodiment and is a view corresponding to FIG. 3 in the first embodiment. In this embodiment, the coupling mechanism 60 includes the coupling member 61 which is the same U-shaped member as that of the first embodiment, and the coupling member 61 moves along the predetermined second direction X by a coupling member guide portion 11D formed in the base member 11 together with the driven pivot 42. The base member 11 is further provided with the driving source attachment portion 70 supporting the driving source 51. In this embodiment, the first moving pivot performs a circular motion around the first fixed pivot 41, and therefore the pressing apparatus may be further provided with a conversion mechanism converting the circular motion into a motion along the first direction Z. Although not illustrated in FIG. 9, the link mechanism 20 of this embodiment includes the first link set 20A and the second link set 20B.

Fourth Embodiment

Hereinafter, the pressing apparatus 10 according to a fourth embodiment is described with reference to the drawings. This embodiment is different from the first embodiment in that the type of the link mechanism 20 is different and the driving device 50 does not include the decelerator 52 and the shaft joint 53. The following description focuses on the differences from the first embodiment. The respects not particularly described are the same as those in the first embodiment.

Figure 10:
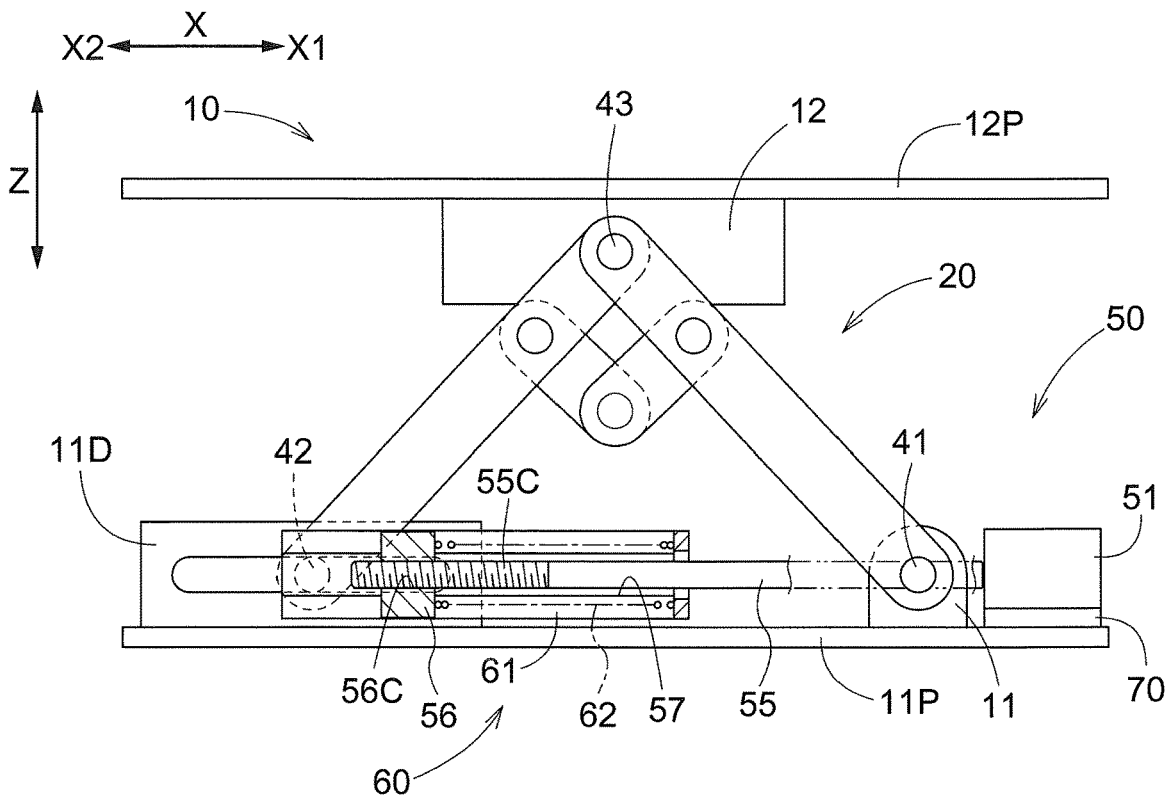
FIG. 10 is a cross-sectional view of a pressing apparatus according to a fourth embodiment.

FIG. 10 is a cross-sectional view of the pressing apparatus 10 according to the fourth embodiment and is a view corresponding to FIG. 3 in the first embodiment. In this embodiment, the coupling mechanism 60 includes the coupling member 61 which is the same U-shaped member as that of the first embodiment, and the coupling member 61 moves along the predetermined second direction X by the coupling member guide portion 11D formed in the base member 11 together with the driven pivot 42. The base member 11 is further provided with the driving source attachment portion 70 supporting the driving source 51. In this embodiment, the first moving pivot 43 performs a circular motion around the first fixed pivot 41, and therefore the pressing apparatus 10 may be further provided with a conversion mechanism converting the circular motion into a motion along the first direction Z. Although not illustrated in FIG. 10, the link mechanism 20 of this embodiment includes the first link set 20A and the second link set 20B.

Fifth Embodiment

Hereinafter, the pressing apparatus 10 according to a fifth embodiment is described with reference to the drawings. This embodiment is different from the first embodiment in that the type of the link mechanism 20 is different and the driving device 50 does not include the decelerator 52 and the shaft joint 53. The following description focuses on the differences from the first embodiment. The respects not particularly described are the same as those in the first embodiment.

Figure 11:
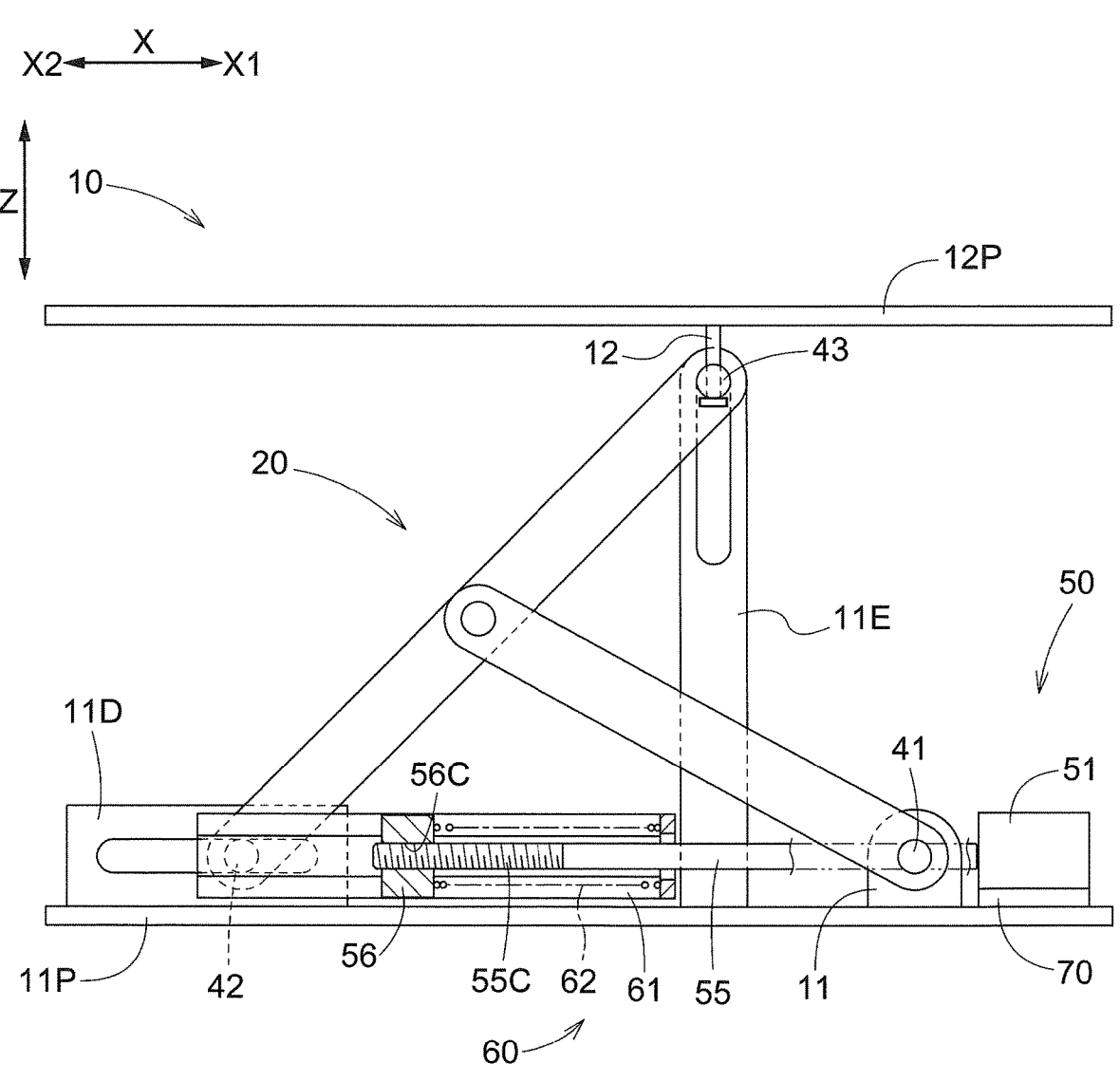
FIG. 11 is a cross-sectional view of a pressing apparatus according to a fifth embodiment.

FIG. 11 is a cross-sectional view of the pressing apparatus 10 according to the fifth embodiment and is a view corresponding to FIG. 3 in the first embodiment. In this embodiment, the coupling mechanism 60 includes the coupling member 61 which is the same U-shaped member as that of the first embodiment, and the coupling member 61 moves along the predetermined second direction X by the coupling member guide portion 11D formed in the base member 11 together with the driven pivot 42. The base member 11 is further provided with the driving source attachment portion 70 supporting the driving source 51. Although not illustrated in FIG. 11, the link mechanism 20 of this embodiment includes the first link set 20A and the second link set 20B. Further, the link mechanism 20 of this embodiment is formed, in the base member 11, with a moving pivot guide portion 11E guiding the first moving pivot 43 to move along the first direction Z unlike the third embodiment and the fourth embodiment. The top plate portion 12P of this embodiment may be further provided with a top plate guide portion (not illustrated) stably moving the top plate portion 12P along the first direction Z.

Other Embodiments

Next, other embodiments of the pressing apparatus 10 are described.

(1) The embodiments above give the description taking the configuration in which the pressing apparatus 10 is provided in the towing vehicle 80 and the driving wheels 81 of the towing vehicle 80 are pressed against the surface G as an example. However, the present disclosure is not limited to such an example, and the pressing apparatus 10 may be provided in a chuck mechanism of a transfer device, an article holding mechanism in a transport device, and the like, for example.

(2) The embodiments above give the description taking the configuration in which the pressing apparatus 10 includes the control device 100 controlling the driving device 50 as an example. However, the present disclosure is not limited to such an example, and a configuration may be acceptable in which the pressing apparatus 10 does not include the control device 100, and the driving device 50 is operated by a worker, for example.

(3) The embodiments above give the description taking the configuration in which the spring member 62 is a coil spring as an example. However, the present disclosure is not limited to such an example, and a configuration may be acceptable in which the spring member 62 contains a plate spring or a plurality of stacked disc springs, for example.

(4) The embodiments above give the description taking the configuration in which the first direction Z is the vertical direction and the second direction X is the direction orthogonal to the vertical direction as an example. However, the present disclosure is not limited to such an example, and the first direction Z may be a direction inclined with respect to the vertical direction or may be a horizontal direction, for example. A configuration may be acceptable in which the first direction Z and the second direction X are parallel to each other and the driven pivots 42 and the first moving pivots 43 move to the sides opposite to each other or the same side, for example.

(5) The embodiments above give the description taking the configuration in which the pressing members 12 include the top plate portions 12P and the engaging portions 85 which are the protruding portions, and the press object T includes the engagement sections 95 which are the recessed portions as an example. However, the present disclosure is not limited to such an example, and the pressing members 12 do not have to include the top plate portions 12P, for example. The base members 11 do not have to include the bottom plate portions 11P. For example, the engaging portions 85 may be recessed portions and the engagement sections 95 may be protruding portions. The engagement sections 95 may be through holes. The pressing members do not have to include the engaging portions 85 and the press object T does not have to include the engagement sections 95.

(6) The embodiments above give the description taking the configuration in which the driving device 50 includes the guide portions 57 guiding the driven member 56, the first threaded portion 55C is the male threaded portion, and the second threaded portion 56C is the female threaded portion as an example. However, the present disclosure is not limited to such an example, and the driving device 50 does not have to include the guide portions 57, the first threaded portion 55C may be a female threaded portion provided on the inner peripheral surface of the driving shaft 55 having a cylindrical shape, and the driven member 56 may be a bolt-like member including the second threaded portion 56C which is a male threaded portion screwed with the female threaded portion of the driving shaft 55, for example.

(7) The embodiments above give the description taking the configuration in which the guide portions 57 guiding the driven member 56 are formed in the coupling member 61 as an example. However, the present disclosure is not limited to such an example, and a configuration may be acceptable in which the guide portions 57 are formed in the driving source attachment portion 70 or the interlocking-pivot coupling member 75, for example. In the second embodiment, the guide members 58 in which the guide portions 57 are formed may be fixed to the driving source attachment portion 70 or the interlocking-pivot coupling member 75. In the third embodiment, the fourth embodiment, and the fifth embodiment, the guide portions 57 may be formed in the base members 11.

(8) The first embodiment gives the description taking the configuration in which the driving source attachment portion 70 including the bearing 72 and the interlocking-pivot coupling member 75 are integrally provided as an example. However, the present disclosure is not limited to such an example, and the driving source attachment portion 70 and the interlocking-pivot coupling member 75 may be separately provided, for example. A configuration may be acceptable in which the bearing 72 is provided in the interlocking-pivot coupling member 75 and the driving source attachment portion 70 is provided in the coupling member 61, for example.

(9) The configurations disclosed in the embodiments described above are also applicable in combination with the configurations disclosed in other embodiments insofar as no contradiction arises. Also with respect to the other configurations, the embodiments disclosed in this specification are merely examples in all the respects. Therefore, various modifications can be made as appropriate without departing from the gist of the present disclosure.

SUMMARY OF EMBODIMENTS ABOVE

Hereinafter, the pressing apparatus described above is described.

The pressing apparatus according to the present disclosure includes: the base members; the pressing members configured to move in the predetermined first direction with respect to the base members to be in the pressed state, in which the pressing member is pressed against the press object, or the separated state, in which the pressing member is separated from the press object; the link mechanism coupling the base members and the pressing members; the driving device configured to drive the link mechanism; and the coupling mechanism coupling the link mechanism and the driving device, in which the link mechanism includes: the at least one fixed pivot having the fixed position with respect to the base members; the at least one driven pivot configured to be driven by the driving device and move along the predetermined second direction; and the at least one moving pivot having the fixed position with respect to the pressing members and configured to move in the first direction together with the movement of the driven pivot, the driving device includes: the driving source; the driving shaft arranged along the second direction and drivable by the driving source to rotate; the first threaded portion provided for the driving shaft; and the driven member including the second threaded portion screwed with the first threaded portion and configured to move along the second direction in response to the rotation of the driving shaft; and the coupling mechanism includes: the coupling member having the fixed positions with respect to the driven pivots; and the spring member having elasticity in the second direction and configured to apply elastic force between the driven member and the coupling member.

According to this configuration, the driving force of the driving source is converted into the driving force in the second direction of the driven member, and the driven pivots are moved back and forth along the second direction, whereby the pressing members in which the moving pivots are fixed can be moved in the first direction and the pressing members can be pressed against the press object. Further, the driven member is moved in the direction in which the pressing members are further pressed against the press object from the state in which the pressing members abut on the press object, thereby achieving the state in which elastic force of the spring member is applied to the coupling member and the driven member. Thus, the pressing members can be brought into the state of being pressed against the press object with the force corresponding to the elasticity of the spring member, and, even when the position in the first direction of the press object with respect to the base members fluctuates, the positions in the first direction of the pressing members follow the movement of the press object, and therefore the pressed state is easily maintained.

As one aspect, it is suitable that the link mechanism further includes the first link set and the second link set each including one of the fixed pivots, one of the driven pivot, and one of the moving pivots and configured to operate identically, the first link set and the second link set are arranged apart from each other in a third direction orthogonal to the second direction as viewed in the first direction, the coupling member couples a driven pivot of the first link set and the driven pivot of the second link set, and the driving shaft, the driven member, the coupling member, and the spring member are arranged between the first link set and the second link set in the third direction.

According to this configuration, when the pair of link sets is provided, the driving shaft, the driven member, the coupling member, and the spring member are arranged between the pair of link sets in the third direction, and therefore the dimension in the second direction of the pressing apparatus can be made smaller than that when the driving shaft, the driven member, the coupling member, the spring member, and the pair of link sets are arranged in the second direction.

As one aspect, it is suitable that, when the side where the fixed pivots are arranged with respect to the driven pivots in the second direction is defined as the second-direction first side, the driving source is arranged on the second-direction first side relative to the fixed pivots, the coupling member includes the first attachment portion attached to the driven pivot of the first link set, the second attachment portion attached to the driven pivot of the second link set, the first extension portion extending from the first attachment portion to the second-direction first side, the second extension portion extending from the second attachment portion to the second-direction first side, and the connection portion connecting the first extension portion and the second extension portion in the third direction on the second-direction first side of the first attachment portion and the second attachment portion, the driven member is arranged at a position between the first extension portion and the second extension portion in the third direction and overlaps with the first extension portion and the second extension portion as viewed in the third direction, and the spring member is a compression spring and is held between the first extension portion and the second extension portion in the third direction and between the driven member and the connection portion in the second direction.

According to this configuration, the coupling member can appropriately couple the driven pivot of the first link set and the driven pivot of the second link set, and the driven member and the spring member can be placed in the space surrounded by the coupling member. Therefore, the dimension of the pressing apparatus can be made small.

As one aspect, it is suitable that the link mechanism includes the interlocking pivots configured to move to the side opposite to the driven pivots along the second direction as viewed in the first direction together with the movement of the driven pivots, the at least one first fixed pivots and the at least one second fixed pivots arranged in the second direction as the fixed pivots, the at least one first moving pivot and the at least one second moving pivot arranged in the second direction as the moving pivots, the at least one first link each connecting the first fixed pivot and the driven pivot, the at least one second link each connecting the first moving pivot and the driven pivot, the at least one third link each connecting the second fixed pivot and the interlocking pivot, the at least one fourth link each connecting the second moving pivot and the interlocking pivot, the first gears fixed to the first links coaxially with the first fixed pivots, the second gears fixed to the second links coaxially with the first moving pivots, the third gears fixed to the third links coaxially with the second fixed pivots, and the fourth gears fixed to the fourth links coaxially with the second moving pivots, and that the first gears and the third gears are engaged with each other and the second gears and the fourth gears are engaged with each other.

This configuration makes it easy to support a large load in the first direction between the base members and the pressing members. Further, this configuration makes it easy to maintain the attitude of the pressing members because the inclination of the pressing members with respect to the base members is regulated.

As one aspect, it is suitable that the base members are fixed to the towing vehicle including the driving wheels, the press object is the engagement section provided for the towed vehicle configured to be towed by the towing vehicle, the pressing member includes the engaging portion engageable with the engagement sections, the first direction is the vertical direction, and the pressing member is pressed against the press object from below for the engaging portion to become engaged with the engagement section, and the driving wheels are pressed against the surface by the reaction force that the pressing members receive from the press object.

According to this configuration, the engaging portions of the towing vehicle can be engaged with the engagement sections of the towed vehicle by the pressing by the pressing apparatus, and the driving wheels can be pressed against the surface by the reaction force that the pressing members receive from the press object, thereby ensuring a large friction force of the driving wheels. Accordingly, even when the weight of the towed vehicle is heavy, the slippage of the driving wheels of the towing vehicle is easily minimized.

As one aspect, it is suitable that the control device controlling the driving device is further provided, and that the control device is configured to control the amount by which the driving source rotates the driving shaft such that the deflection amount of the spring member increases with an increase in the weight of the towed vehicle.

According to this configuration, the pressing force by the pressing apparatus can be increased with an increase in the weight of the towed vehicle. Accordingly, the pressing force by the pressing apparatus is easily set to an appropriate magnitude and the slippage of the driving wheels of the towing vehicle is easily minimized.

What is claimed is:

1. A pressing apparatus comprising:

a base member;

a pressing member configured to move in a predetermined first direction with respect to the base member to be in a pressed state, in which the pressing member is pressed against a press object, or a separated state, in which the pressing member is separated from the press object;

a link mechanism coupling the base member and the pressing member;

a driving device configured to drive the link mechanism; and a coupling mechanism coupling the link mechanism and the driving device, wherein:

the link mechanism comprises:

at least one fixed pivot having a fixed position with respect to the base member;

at least one driven pivot configured to be driven by the driving device and move along a predetermined second direction;

at least one moving pivot having a fixed position with respect to the pressing member and configured to move in the first direction together with the movement of the driven pivot;

at least one interlocking pivot configured to move to a side opposite to the driven pivot along the second direction as viewed in the first direction together with the driven pivot;

at least one first fixed pivot and at least one second fixed pivot arranged in the second direction as the fixed pivots;

at least one first moving pivot and at least one second moving pivot arranged in the second direction as the moving pivots;

at least one first link each connecting the first fixed pivot and the driven pivot;

at least one second link each connecting the first moving pivot and the driven pivot;

at least one third link each connecting the second fixed pivots and the interlocking pivots;

at least one fourth link each connecting the second moving pivots and the interlocking pivots;

first gears fixed to the first links coaxially with the first fixed pivots;

second gears fixed to the second links coaxially with the first moving pivots;

third gears fixed to the third links coaxially with the second fixed pivots; and fourth gears fixed to the fourth links coaxially with the second moving pivots, and the first gears and the third gears are engaged with each other and the second gears and the fourth gears are engaged with each other;

the driving device comprises:

a driving source;

a driving shaft arranged along the second direction and drivable by the driving source to rotate;

a first threaded portion provided for the driving shaft; and a driven member comprising a second threaded portion screwed with the first threaded portion and configured to move along the second direction in response to the rotation of the driving shaft; and the coupling mechanism comprises:

a coupling member having a fixed position with respect to the driven pivots; and a spring member having elasticity in the second direction and configured to apply elastic force between the driven member and the coupling member.

2. A pressing apparatus comprising:

a base member;

a pressing member configured to move in a predetermined first direction with respect to the base member to be in a pressed state, in which the pressing member is pressed against a press object, or a separated state, in which the pressing member is separated from the press object;

a link mechanism coupling the base member and the pressing member;

a driving device configured to drive the link mechanism; and a coupling mechanism coupling the link mechanism and the driving device, wherein:

the link mechanism comprises:

at least one fixed pivot having a fixed position with respect to the base member;

at least one driven pivot configured to be driven by the driving device and move along a predetermined second direction;

at least one moving pivot having a fixed position with respect to the pressing member and configured to move in the first direction together with the movement of the driven pivot; and a first link set and a second link set each including one of the fixed pivots, one of the driven pivots, and one of the moving pivots and configured to operate identically, the first link set and the second link set are arranged apart from each other in a third direction orthogonal to the second direction as viewed in the first direction, the driving device comprises:

a driving source;

a driving shaft arranged along the second direction and drivable by the driving source to rotate;

a first threaded portion provided for the driving shaft; and a driven member comprising a second threaded portion screwed with the first threaded portion and configured to move along the second direction in response to the rotation of the driving shaft; and the coupling mechanism comprises:

a coupling member having a fixed position with respect to the driven pivots; and a spring member having elasticity in the second direction and configured to apply elastic force between the driven member and the coupling member, the coupling member couples a driven pivot of the first link set and a driven pivot of the second link set, and the driving shaft, the driven member, the coupling member, and the spring member are arranged between the first link set and the second link set in the third direction.

3. The pressing apparatus according to claim 2, wherein:

when a side where the fixed pivots are arranged with respect to the driven pivot in the second direction is defined as a second-direction first side, the driving source is arranged on the second-direction first side relative to the fixed pivots, the coupling member comprises:

a first attachment portion attached to the driven pivot of the first link set;

a second attachment portion attached to the driven pivot of the second link set;

a first extension portion extending from the first attachment portion to the second-direction first side;

a second extension portion extending from the second attachment portion (64B) to the second-direction first side (X1); and a connection portion connecting the first extension portion and the second extension portion in the third direction on the second-direction first side of the first attachment portion and the second attachment portion, the driven member is arranged at a position between the first extension portion and the second extension portion in the third direction, and overlaps with the first extension portion and the second extension portion as viewed in the third direction, and the spring member is a compression spring and is held between the first extension portion and the second extension portion in the third direction and between the driven member and the connection portion in the second direction.

4. A pressing apparatus comprising:

a base member;

a pressing member configured to move in a predetermined first direction with respect to the base member to be in a pressed state, in which the pressing member is pressed against a press object, or a separated state, in which the pressing member is separated from the press object;

a link mechanism coupling the base member and the pressing member;

a driving device configured to drive the link mechanism; and a coupling mechanism coupling the link mechanism and the driving device, wherein:

the link mechanism comprises:

at least one fixed pivot having a fixed position with respect to the base member;

at least one driven pivot configured to be driven by the driving device and move along a predetermined second direction; and at least one moving pivot having a fixed position with respect to the pressing member and configured to move in the first direction together with the movement of the driven pivot, the driving device comprises:

a driving source;

a driving shaft arranged along the second direction and drivable by the driving source to rotate;

a first threaded portion provided for the driving shaft; and a driven member comprising a second threaded portion screwed with the first threaded portion and configured to move along the second direction in response to the rotation of the driving shaft; and the coupling mechanism comprises:

a coupling member having a fixed position with respect to the driven pivots; and a spring member having elasticity in the second direction and configured to apply elastic force between the driven member and the coupling member, the base member is fixed to a towing vehicle including a driving wheel, the press object is an engagement section provided for a towed vehicle configured to be towed by the towing vehicle, the pressing member includes an engaging portion engageable with the engagement section, the first direction is a vertical direction, the pressing member is pressed against the press object from below for the engaging portion to become engaged with the engagement section, and the driving wheel is pressed against a surface by a reaction force that the pressing member receives from the press object.

5. The pressing apparatus according to claim 4, further comprising:

a control device configured to control the driving device, and wherein the control device is configured to control an amount by which the driving source rotates the driving shaft such that a deflection amount of the spring member increases with an increase in a weight of the towed vehicle.

* * * * *